US009992626B2

(12) United States Patent
Tarkkala et al.

(10) Patent No.: US 9,992,626 B2
(45) Date of Patent: Jun. 5, 2018

(54) METHOD AND APPARATUS FOR PROVIDING LOCATION-BASED SERVICES USING LOCATION-BASED TRACES

(71) Applicants: Lauri Aarno Olavi Tarkkala, Berlin (DE); Thomas Piekenbrock, Berlin (DE); Jari Karjala, Helsinki (FI)

(72) Inventors: Lauri Aarno Olavi Tarkkala, Berlin (DE); Thomas Piekenbrock, Berlin (DE); Jari Karjala, Helsinki (FI)

(73) Assignee: HERE Global B.V., Veldhoven (NL)

( * ) Notice: Subject to any disclaimer, the term of this patent is extended or adjusted under 35 U.S.C. 154(b) by 258 days.

(21) Appl. No.: 13/665,537

(22) Filed: Oct. 31, 2012

(65) Prior Publication Data

US 2014/0120944 A1 May 1, 2014

(51) Int. Cl.
H04W 4/02 (2009.01)
G01C 21/36 (2006.01)
H04W 4/04 (2009.01)

(52) U.S. Cl.
CPC ........ H04W 4/028 (2013.01); G01C 21/3617 (2013.01); G01C 21/3679 (2013.01); H04W 4/027 (2013.01); H04W 4/04 (2013.01)

(58) Field of Classification Search
CPC ....................................................... H04W 4/02
USPC ............................................. 455/456.1–457
See application file for complete search history.

(56) References Cited

U.S. PATENT DOCUMENTS

| 6,591,188 | B1 | 7/2003 | Ohler |
| 2007/0010942 | A1 | 1/2007 | Bill |
| 2009/0006211 | A1* | 1/2009 | Perry et al. ............... 705/14 |
| 2010/0070171 | A1 | 3/2010 | Barbeau et al. |
| 2011/0028164 | A1* | 2/2011 | Kato ........................ 455/456.1 |
| 2011/0046878 | A1 | 2/2011 | Sung et al. |
| 2011/0051665 | A1 | 3/2011 | Huang |
| 2012/0058782 | A1* | 3/2012 | Li ............................. 455/456.2 |

FOREIGN PATENT DOCUMENTS

EP     2 051 490 A2     4/2009

OTHER PUBLICATIONS

International Search Report for corresponding International application No. PCT/IB/2013/058452, dated Feb. 27, 2014, 4 pages.

(Continued)

Primary Examiner — Nam Huynh
(74) Attorney, Agent, or Firm — Ditthavong & Steiner, P.C.

(57) ABSTRACT

An approach is provided for providing contemporaneous traces of user movement for algorithms and methods of location-based applications and/or services. The location traces platform determines a request, from one or more applications, for location information associated with at least one device. The location traces platform determines one or more location traces associated with the at least one device, wherein the one or more location traces represent at least a portion of a movement history associated with the at least one device. The location traces platform causes, at least in part, a return of the one or more location traces, one or more service parameters, one or more service suggestions, or a combination thereof to the one or more applications in response to the request.

18 Claims, 10 Drawing Sheets

(56) References Cited

OTHER PUBLICATIONS

Written Opinion for corresponding International application No. PCT/IB/2013/058452, dated Feb. 27, 2014, 9 pages.
Office Action for corresponding European Patent Application No. 13850169.7-1870, dated Apr. 13, 2016, 8 Pages.

* cited by examiner

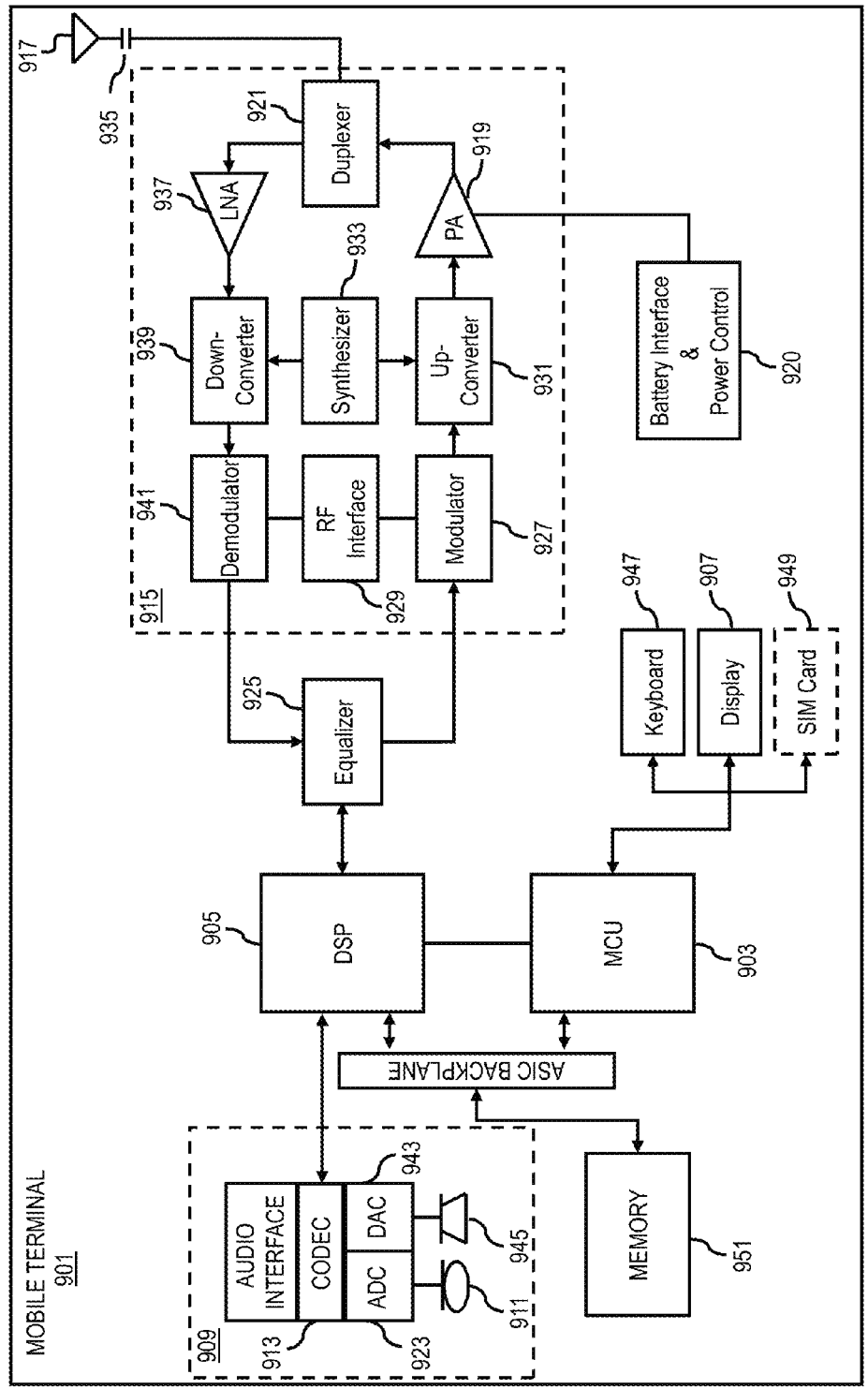

METHOD AND APPARATUS FOR PROVIDING LOCATION-BASED SERVICES USING LOCATION-BASED TRACES

BACKGROUND

Service providers and device manufacturers (e.g., wireless, cellular, etc.) are continually challenged to deliver value and convenience to consumers by, for example, providing compelling network services. One area of interest has been the development of location-based services to provide users of mobile devices (e.g., mobile phones, tablets, personal navigation devices, etc.) with navigation assistance to improve the quality of their travels (e.g., walking, driving, etc.). By way of example, many mobile devices are now equipped with global positioning system (GPS) receivers and mapping and/or navigation applications for presenting location-based information (e.g., maps, travel directions, route details, points of interest (POIs), etc.) to users. However, current location-based services are generally based on algorithms and methods that are driven by single coordinates as an input (e.g., a current location) or require the user to run the application for a number of minutes (e.g., 5-10 minutes) to record a location trace. These requirements limit the ability of the algorithms and methods of the location-based services to use map data—or past behavioral data of the user—to optimize results. Accordingly, service providers and device manufacturers face significant technical challenges in providing a location-based service that contemporaneously considers a user's recent movement history to create better predictions, more accurate results, more relevant renderings, or a combination thereof.

SOME EXAMPLE EMBODIMENTS

Therefore, there is a need for an approach for providing contemporaneous traces of user movement for algorithms and methods of location-based applications and/or services.

According to one embodiment, a method comprises determining a request, from one or more applications, for location information associated with at least one device. The method also comprises determining one or more location traces associated with the at least one device, wherein the one or more location traces represent at least a portion of a movement history associated with the at least one device. The method further comprises causing, at least in part, a return of the one or more location traces, one or more service parameters, one or more service suggestions, or a combination thereof to the one or more applications in response to the request.

According to another embodiment, an apparatus comprises at least one processor, and at least one memory including computer program code for one or more computer programs, the at least one memory and the computer program code configured to, with the at least one processor, cause, at least in part, the apparatus to determine a request, from one or more applications, for location information associated with at least one device. The apparatus is also caused to determine one or more location traces associated with the at least one device, wherein the one or more location traces represent at least a portion of a movement history associated with the at least one device. The apparatus further causes, at least in part, a return of the one or more location traces, one or more service parameters, one or more service suggestions, or a combination thereof to the one or more applications in response to the request.

According to another embodiment, a computer-readable storage medium carries one or more sequences of one or more instructions which, when executed by one or more processors, cause, at least in part, an apparatus to determine a request, from one or more applications, for location information associated with at least one device. The apparatus is also caused to determine one or more location traces associated with the at least one device, wherein the one or more location traces represent at least a portion of a movement history associated with the at least one device. The apparatus further causes, at least in part, a return of the one or more location traces, one or more service parameters, one or more service suggestions, or a combination thereof to the one or more applications in response to the request.

According to another embodiment, an apparatus comprises means for determining a request, from one or more applications, for location information associated with at least one device. The apparatus also comprises means for determining one or more location traces associated with the at least one device, wherein the one or more location traces represent at least a portion of a movement history associated with the at least one device. The apparatus further comprises means for causing, at least in part, a return of the one or more location traces, one or more service parameters, one or more service suggestions, or a combination thereof to the one or more applications in response to the request.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 9 is a diagram of a mobile terminal (e.g., handset) that can be used to implement an embodiment of the invention.

DESCRIPTION OF SOME EMBODIMENTS

Examples of a method, apparatus, and computer program for providing contemporaneous traces of user movement for algorithms and methods of location-based applications and/or services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
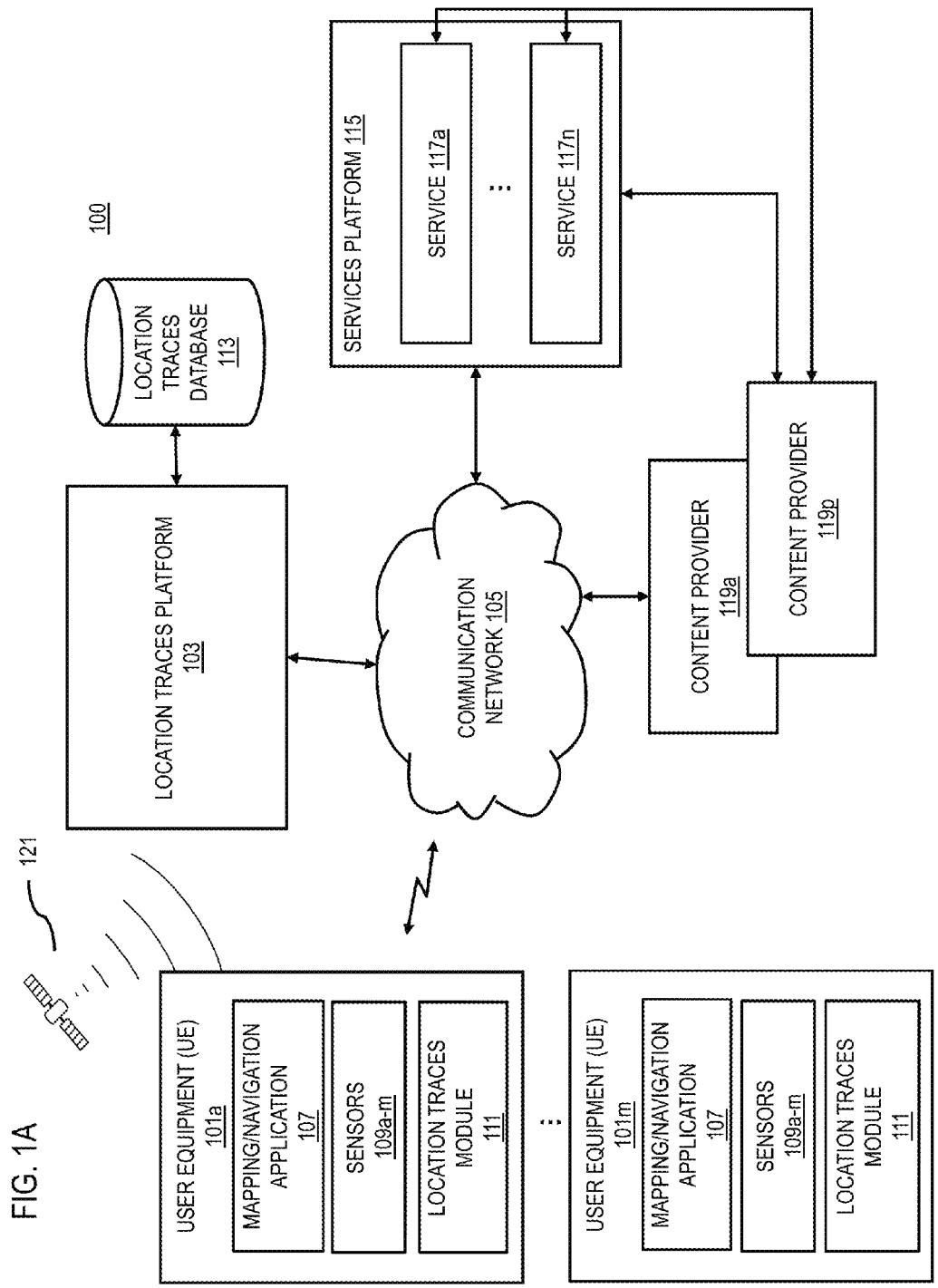
FIG. 1A is a diagram of a system capable of providing contemporaneous traces of user movement for algorithms and methods of location-based applications and/or services, according to one embodiment.

FIG. 1A is a diagram of a system capable of providing contemporaneous traces of user movement for algorithms and methods of location-based applications and/or services, according to one embodiment. As previously discussed, one area of interest among service providers and device manufacturers has been the development of location-based services to provide users of mobile devices with navigation assistance to improve the quality of their travels. However, current location-based services are generally based on algorithms and methods that are driven by single coordinates as an input (e.g., a current location) or require the user to run the application for a number of minutes (e.g., 5-10 minutes) to record a trace location. In particular, the single coordinate is often generated using a positioning service, often powered by a GPS receiver and optimized via a network positioning service. For example, a reverse geo-coding service can output a human-readable address when it receives a World Geodetic System 84 (WGS-84) coordinate as input. These requirements, however, limit the ability of the algorithms of the location-based services to use map data—or past behavioral data of the user—to optimize results.

To address this problem, a system 100 of FIG. 1A introduces the capability to provide contemporaneous traces of user movement for algorithms and methods of location-based applications and/or services. As shown in FIG. 1A, the system 100 comprises a user equipment (UE) 101a-101m (e.g., mobile phones and/or tablets) (also collectively referred to as UEs 101) having connectivity to a location traces platform 103 via a communication network 105. The UEs 101 include or have access to a mapping/navigation application 107. By way of example, the mapping/navigation application 107 may include, at least in part, a navigation application, a mapping application, a location-based services application, or a combination thereof and may be used to navigate a city as a pedestrian, for example. Moreover, the UEs 101 also include one or more sensors 109a-109m (also collectively referred to as sensors 109). In one example use case, the sensors 109 may include a GPS receiver, a low power positioning module, a compass, a magnetometer, an accelerometer, etc.

In one embodiment, the UEs 101 may also include a location traces module 111 that has substantially similar capabilities as the location traces platform 103. In particular, it is contemplated that one embodiment of the present invention disclosed herein may be fully client-based (i.e., the one or more location traces could be pre-processed on the client) if the needed map data is available on a UE 101 in vector format; the one or more location traces are annotated with attributes such as roads, addresses, buildings, etc.; the one or more location traces are compressed for efficient storage, transmission, and look-up, the computation needed (e.g., the computation done by the location traces platform 103) can be effectively executed in a UE 101; the index of the one or more location traces corresponding to the one or more service parameters, the one or more service suggestions, or a combination thereof is available on a UE 101; one or more location traces of other users are not needed for the computations; and the one or more location traces associated with a user or the one or more service parameters, the one or more service suggestions, or a combination thereof are not to be shared with more than one UE 101 owned by the same user via a cloud-based service (e.g., the location traces platform 103), for example. If the above constraints are not substantially valid, then an exemplary embodiment would also include a location traces platform 103 available over the communication network 105. Therefore, while the location traces platform 103 and the location traces module 111 are interchangeable, the various embodiments of the present invention disclosed herein mainly reference the location traces platform 103 for the sake of explanation.

In one embodiment, the location traces platform 103 may include or be associated with at least one traces database 113, which may exist in whole or in part within the location traces platform 103 or the location traces module 111. In one example embodiment, the location traces platform 103 may exist in whole or in part within the UEs 101, or independently. The traces database 113 may include one or more indexed location traces associated with the UEs 101, including at least in part, timestamp information, position information, velocity information, direction information, or a combination thereof. The traces database 113 may also include one or more service parameters, one or more service suggestions, or a combination thereof associated with the one or more indexed location traces. In one example use case, the one or more service parameters, the one or more service suggestions, or a combination thereof may include one or more points of interest (POIs) associated with an indexed movement history (e.g., a walk through a city), one or more location-based advertisements, one or more descriptions of routes traveled, etc. Further, the traces database 113 also may include mapping data in a vector format (e.g., roads, addresses, building, etc.).

The UEs 101 are also connected to a services platform 115 via the communication network 105. The services platform 115 includes one or more services 117a-117n (also collectively referred to as services 117). The services 117 may include a wide-variety of content provisioning services for the mapping/navigation application 107 (e.g., POIs, offers, related media, etc.). In addition, the UEs 101, the services platform 115, and the services 117 are also connected to one or more content providers 119a-119p (also collectively referred to as content providers 119) via the communication network 105. The content providers 119 also may provide a wide variety of content (e.g., maps, customer reviews, etc.) to the components of the system 100.

In one embodiment, the location traces platform 103, the mapping/navigation application 107, or a combination thereof may utilize location-based technologies (e.g., GPS, cellular triangulation, Assistant GPS (A-GPS), etc.) to determine a movement history of a UE 101 (e.g., a 5-minute walk through a city). For example, a UE 101 may include a GPS receiver to obtain geographic coordinates from satellites 121 to determine its movement history.

In one embodiment, the system 100 determines a request from one or more applications (e.g., a mapping/navigation application 107) for location information associated with at least one device (e.g., a mobile phone, a tablet, a personal navigation device, etc.). In one example use case, a user may be on vacation and/or sightseeing in a well-known city such as New York City and the user may want to use his or her mobile device (e.g., a UE 101) to determine where he or she is within the city or how to get to a particular landmark or POI.

In one embodiment, the system 100 processes and/or facilitates a processing of sensor information associated with the one or more devices to generate one or more location traces, at least a portion of a movement history, or a combination thereof. By way of example, the one or more devices may include a GPS receiver, a low power positioning module, a compass, a magnetometer, an accelerometer, etc. In one example use case, the one or more location traces are always available to the one or more applications even if the one or more location traces were not specifically determined for a particular one of the one or more applications, and the one or more location traces also include a tuple sequence of timestamp, position, velocity, and direction derived from the one or more sensors (e.g., the sensors 109) with velocity and direction being optional. By way of example, the low power positioning module may be "always-on" and, therefore, constantly populating and updating the location traces database 113, for example, with one or more location traces. More specifically, the one or more location traces could represent the movement history of a user on a map during a 5-minute walk through the city.

In one embodiment, once the system 100 determines a request for location information (e.g., a request from the mapping/navigation application 107), the system 100 determines one or more location traces associated with at least one device (e.g., a UE 101). In one example use case, the system 100 determines the one or more location traces by receiving them from the location traces platform 103, having first determined them from the sensor information associated with the one or more devices (e.g., derived from the sensors 109).

In one embodiment, the system 100 determines the one or more location traces in substantially real-time, periodically, according to a schedule, or a combination thereof. For example, if the low power positioning module 133 is "always-on," the system 100 can determine the one or more location traces in substantially real time. Consequently, the mapping/navigation application 107, for example, can have immediate access to the user's recent movement history, which can avoid the often annoying need to run the mapping/navigation application 107 actively for 5-10 minutes, for example, in the foreground to generate the one or more location traces.

In one or more embodiments, the system 100 causes, at least in part, an indexing of the one or more location traces, one or more service parameters, one or more service suggestions, or a combination thereof on the one or more devices (e.g., the UEs 101), a server (e.g., the location traces platform 103), or a combination thereof. By way of example, it is contemplated that the system 100 may index a particular location trace (e.g., trace "1") with a corresponding service suggestion (e.g., place or POI "1"), for example, trace "2" with place "2", and so forth. By way of further example, the one or more service parameters may include a preference to return one or more POIs (e.g., restaurants, banks, landmarks, entertainment facilities, etc.), at least one description of the one or more routes traveled (e.g., public transportation route, planned construction, etc.), etc. that correspond and/or are relevant to the one or more location traces. Similarly, the one or more service suggestions may include one or more particular places (e.g., a well-known or well-liked restaurant, a theater, a shopping mall, etc.), a location-based advertisement, a type of public transportation route (e.g., a bus route, a subway line, a ferry line, etc.), etc. that correspond and/or are relevant to the one or more location traces. As previously discussed, in one example use case, the index is contained within the location traces database 113. Moreover, in one example use case, it is contemplated that the one or more service parameters, the one or more service suggestions, or a combination thereof can be implemented by the system 100 using a predictive Bayesian network, for example. Further, in one embodiment, the system 100 causes, at least in part, at least one update of the one or more indexed location traces contained in the location traces database 113 based, at least in part, on the determination of the one or more location traces by the system 100 (e.g., in substantially real-time, periodically, etc.) Moreover, in one example use case, it is contemplated that the system 100 can update the index even without an application (e.g., the mapping/navigation application 107) running in the background of the one or more devices.

In one embodiment, the system 100 processes and/or facilitates a processing of the one or more location traces to determine the one or more service parameters, the one or more service suggestions (e.g., a place, a public transportation route, etc.), or a combination thereof for one or more location-based services associated with the one or more applications (e.g., a mapping/navigation service). In one example use case, the system 100 determines the one or more service parameters, the one or more service suggestions, or a combination thereof based, at least in part, on an analysis of the index contained within the location traces database 113. In one embodiment, the system 100 more specifically causes, at least in part, a comparison of the one or more location traces against the one or more indexed location traces, wherein the one or more service parameters, the one or more service suggestions, or a combination thereof are associated with the one or more indexed location traces at least substantially matching the one or more location traces based, at least in part, on the comparison. By way of example, the system 100 may determine that one or more location traces corresponding to a user's recent movement history include a portion of $5^{th}$ Avenue in New York, for example. The system 100 can then compare the one or more location traces including $5^{th}$ Avenue against one or more indexed location traces also including a portion of $5^{th}$ Avenue to determine the corresponding and/or relevant one or more service parameters, one or more service suggestions (e.g., nearby restaurants), or a combination thereof contained within the index. In one example use case, it is contemplated that the system 100 may also cause, at least in part, a comparison of the one or more location traces against one or more indexed location traces associated with one or more other users. By way of example, a number of users in a particular location may take the same route or path to a well-known POI and thereby generating a large number of service parameters, services suggestions, or a combination thereof related to the one or more location traces.

In one embodiment, the system 100 causes, at least in part, a return of the one or more location traces, one or more service parameters, one or more service suggestions, or a combination thereof to the one or more application (e.g., the mapping/navigation application 107) in response to the request for location information. It is contemplated that returning the one or more location traces rather than a single coordinate input (e.g., a WGS-84 coordinate) has several advantages in that it allows the one or more applications (e.g., the mapping/navigation application 107) and corresponding networking application programming interfaces (APIs) to instantly determine the movements of a UE 101 when implementing a location-based service as opposed to either (1) relying on a current position or (2) having to run for 5-10 minutes, for example, to record the one or more location traces in response to the request. Moreover, it is also contemplated that by returning the one or more service parameters, the one or more service suggestions (e.g., a place), or a combination thereof the system 100 returns the best possible result to the one or more applications (e.g., the mapping/navigation application 107).

In one embodiment, wherein the one or more applications include, at least in part, a mapping and/or navigation application (e.g., the mapping/navigation application 107), the system can cause, at least in part, a presentation of the one or more location traces, the at least a portion of a movement history, or a combination thereof in association with the mapping and/or navigation application. By way of example, a geocoding application that uses traces could fit or overlay the one or more location traces on a map to return to the user a more visually accurate result compared to a single coordinate (e.g., a GPS coordinate) that will likely have limited accuracy-especially in areas where GPS reception is spotty. Moreover, it is contemplated that the system 100's presentation of a user's 5-minute walking history on the map will more quickly orient the user to his or her surroundings compared to the user's location represented as a "dot" on the map.

In one embodiment, the system 100 processes and/or facilitates a processing of the one or more service parameters, the one or more service suggestions, or a combination thereof to cause, at least in part, at least one presentation of the one or more service parameters, the one or more service suggestions, or a combination thereof in at least one user interface element based, at least in part, on the comparison of the one or more location traces against the one or more indexed location traces. By way of example, the system 100 can cause, at least in part, a presentation in a display of a mobile device of one or more POIs associated with one or more service suggestions, for example.

In one or more embodiments, wherein the one or more applications are running on the one or more devices, the system 100 can cause, at least in part, at least one other presentation of the one or more service parameters, the one or more service suggestions, or a combination thereof based, at least in part, on at least one other comparison, wherein the at least one other comparison is independent of the request. For example, if the mapping/navigation application 107, for example, is running in the background or foreground of a UE 101 and is at least periodically updating the system 100 about the user's movement history based, at least in part, on one or more location traces, then the system 100 can automatically compare the one or more location traces against one or more indexed location traces in the location traces database 113, for example. Then, if the system 100 determines a match, the system 100 can cause, at least in part, a notification to be sent back to the mapping/navigation application 107, informing the user that a relevant service suggestion, for example, has been determined by the system 100. Moreover, it is contemplated that because the location-based application (e.g., the mapping/navigation application 107) is periodically updating the system 100 about the user's movement history with the one or more location traces, the system 100 is able to generate the one or more notifications in a power-efficient manner not just based on an exact location, but also the route travelled, without constantly sending a location to a location-based service, which may quickly drain the battery of a user's mobile device.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

By way of example, the UEs 101, the location traces platform 103, the mapping/navigation application 107, the location traces module 111, the services 117, the content providers 119, and the satellites 121 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
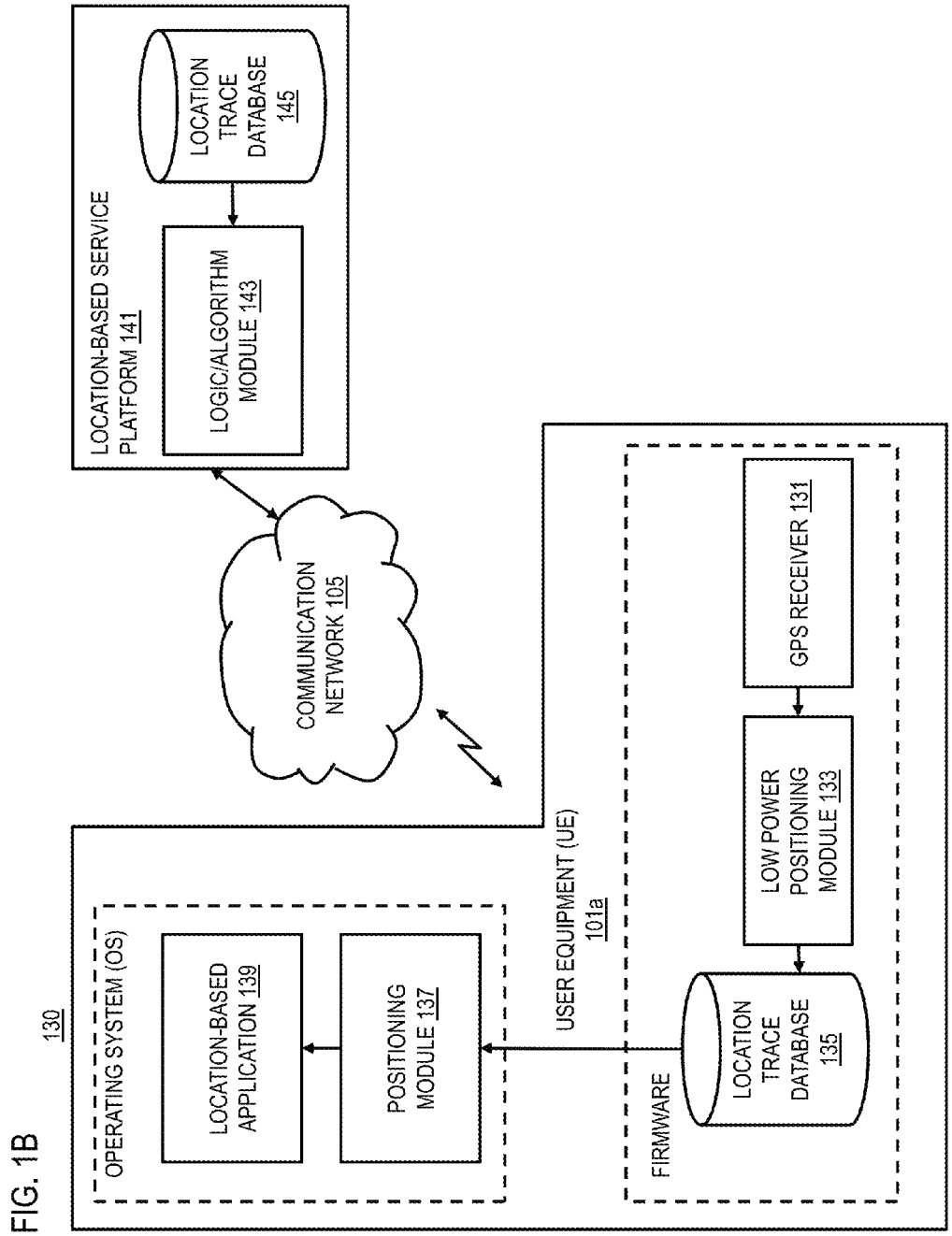
FIG. 1B is a diagram of a system also capable of providing contemporaneous traces of user movement for algorithms and methods of location-based applications and/or services, according to one embodiment.

As shown in FIG. 1B, a system 130 is also capable of providing contemporaneous traces of user movement for algorithms and methods of location-based applications and/or services. The system 100 and the system 130 have substantially similar capabilities, however, the system 130 more specifically illustrates one or more components of a UE 101 of the system 100. As depicted, FIG. 1B comprises a UE 101 (e.g., a mobile phone or a tablet) having firmware that includes, at least in part, a GPS receiver 131, a low power positioning module 133, and a location trace database 135 and an operating system that hosts a positioning module 137 and a location-based application 139. In one embodiment, the low power positioning module 133 constantly populates and updates the location trace database 135 in the firmware of the UE 101. By way of example, when a user starts the location-based application 139, the application will query the positioning module 137 for a location and will receive a location trace in response from the location trace database 135 via the positioning module 137. In one embodiment, the location-based application 139 sends the one or more location traces over the communication network 105 (e.g., using HTTP as a protocol) to a location-based service platform 141 containing a logic and algorithm module 143 for implementing the location-based service and another location trace database 145 that indexes the one or more location traces against possible suggestions for improving the location-based service. In one embodiment, the location-based service platform 141 causes, at least in part, a comparison of the one or more location traces sent by the location-based application 139 against one or more indexed location traces corresponding to one or more service suggestions contained in the other location trace database 145 (e.g., using a predictive Bayesian network) to return to the location-based application 139 the result, which after some processing the location-based application 139 can cause, at least in part, a presentation to the user (e.g., in a display of the UE 101).

Figure 2:
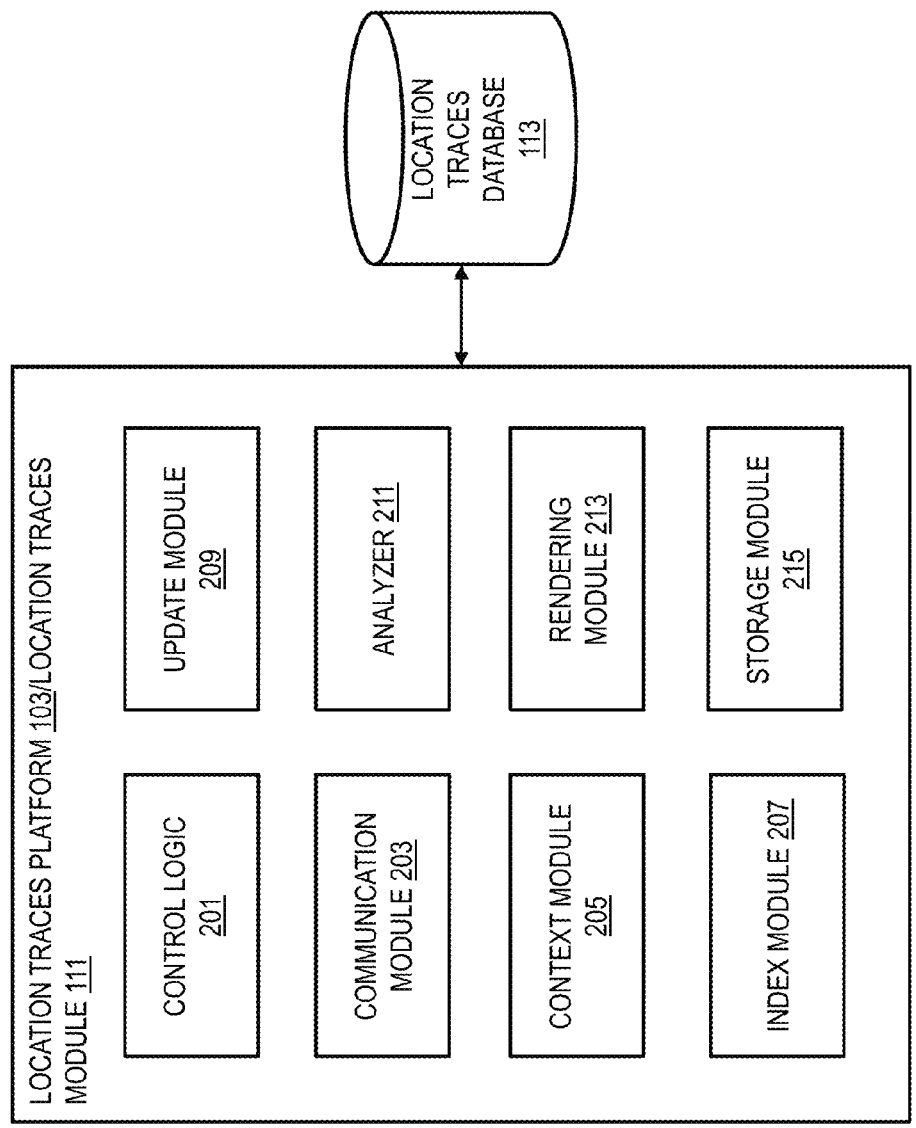
FIG. 2 is a diagram of the components of a location traces platform/location traces module, according to one embodiment.

FIG. 2 is a diagram of the components of location traces platform 103/location traces module 111, according to one embodiment. Again, while the location traces platform 103 and the location traces module 111 are interchangeable, the various embodiments of the present invention disclosed herein mainly reference the location traces platform 103 for the sake of explanation. By way of example, the location traces platform 103 includes one or more components for providing contemporaneous traces of user movement for algorithms and methods of location-based applications and/or services. It is contemplated that the functions of these components may be combined in one or more components or performed by other components of equivalent functionality. In this embodiment, the location traces platform 103 includes a control logic 201, a communication module 203, a context module 205, an index module 207, an update module 209, an analyzer module 211, a rendering module 213, and a storage module 215.

The control logic 201 oversees tasks, including tasks performed by the communication module 203, the context module 205, the index module 207, the update module 209, the analyzer module 211, the rendering module 213, and the storage module 215. For example, although the other modules may perform the actual task, the control logic 201 may determine when and how those tasks are performed or otherwise direct the other modules to perform the task. In one embodiment, the control logic 201 may determine to determine the one or more location traces in substantially real-time, periodically, according to a schedule, or a combination thereof. By way of example, the schedule may be based, at least in part, on computational resources, battery life, etc.

The communication module 203 is used for communication between the UEs 101, the location traces platform 103, the mapping/navigation application 107, the sensors 109, the location traces module 111, the location traces database 113, the service 117, the content providers 119, and the satellites 121. The communication module 203 may also be used to communicate commands, requests, data, etc. The communication module 203 also may be used to determine a request from one or more applications (e.g., receive the request from the mapping/navigation application 107) for location information associated with at least one device. The communication module 203 also may be used to cause, at least in part, a return or transmission of the one or more location traces, the one or more service parameters, the one or more service suggestions, or a combination thereof to the one or more applications (e.g., the mapping/navigation application 107) in response to a request.

In one embodiment, the context module 205 processes and/or facilitates a processing of sensor information associated with the one or more devices (e.g., information derived from the sensors 109) to generate the one or more location traces, the at least a portion of a movement history, or a combination thereof. By way of example, the one or more location traces include, at least in part, timestamp information, position information, velocity information, direction information, or a combination thereof. The context module 205 may also be used to determine the one or more location traces associated with a UE 101, wherein the one or more location traces represent at least a portion of a movement history associated with the UE 101.

The index module 207, in certain embodiments, is used to cause, at least in part, an indexing of the one or more location traces, the one or more service parameters, the one or more service suggestions, or a combination thereof on the one or more devices (e.g., the UEs 101), a server (e.g., the location traces platform 103), or a combination thereof. By way of example, the index module 207 may index or map the one or more location traces to corresponding one or more service parameters, one or more service suggestion (e.g., a POI), or a combination thereof in the location traces database 113 (e.g., trace "1" is indexed to POI "1"). More specifically, the indexing may be implemented by the index module 207 using a predictive Bayesian network, for example. In one embodiment, the update module 209 is used to cause, at least in part, at least one update of the one or more indexed location traces based, at least in part, on the determination of the one or more location traces by the control logic 201 (e.g., in substantially real-time, periodically, etc.).

In one embodiment, the analyzer module 209 processes and/or facilitates a processing of the one or more location traces to determine one or more service parameters, one or more service suggestions (e.g., a POI), or a combination thereof for one or more location-based services associated with the one or more applications (e.g., a mapping/navigation service). By way of example, the analyzer module 209 may determine the corresponding one or more service parameters, one or more service suggestions, or a combination thereof based, at least in part, on the index contained in the location traces database 113. The analyzer module 209 may also be used to cause, at least in part, a comparison of the one or more location traces against one or more indexed location traces, wherein the one or more service parameters, the one or more service suggestions, or a combination thereof are associated with the one or more indexed location traces at least substantially matching the one or more location traces based, at least in part, on the comparison by the analyzer module 209.

In one embodiment, wherein the one or more applications include, at least in part, a mapping and/or navigation application (e.g., the mapping/navigation application 107), the rendering module 213 is used to cause, at least in part, a presentation of the one or more location traces, the at least a portion of a movement history, or a combination thereof in associated with the mapping and/or navigation application. By way of example, the rendering module 213 can overlay a user's 5-minute walking history on a map, orienting the user much more quickly to his or her surroundings compared to representing the user's location as a "dot" on the map. The rendering module 213 may also be used to process and/or facilitate a processing of the one or more service parameters, the one or more service suggestions, or a combination thereof to cause, at least in part, at least one presentation of the one or more service parameters, the one or more service suggestions, or a combination thereof in at least one user interface element based, at least in part, on the comparison of the one or more location traces against the one or more indexed location traces. By way of example, the rendering module 213 can present to the user in a display of the UE 101, for example, one or more POIs associated with the one or more location traces determined by the context module 205. In one embodiment, wherein the one or more applications (e.g., the mapping/navigation application 107) are running on the one or more devices, the rendering module 213, in connection with the analyzer module 211, also may be used to cause, at least in part, at least one other presentation of the one or more service parameters, the one or more service suggestions, or a combination thereof based, at least in part, on the at least one other comparison, wherein the at least one other comparison is independent of the request.

The storage module 215 is used to manage the storage of one or more service parameters, one or more service suggestions, or a combination thereof associated with the one or more indexed location traces. In one example use case, the one or more service parameters, the one or more service suggestions, or a combination thereof may include one or more points of interest (POIs) associated with an indexed movement history (e.g., a walk through a city). In addition, the storage module 215 may also be used to manage the storage of mapping data (e.g., roads, addresses, building, etc. in a vector format).

Figure 3:
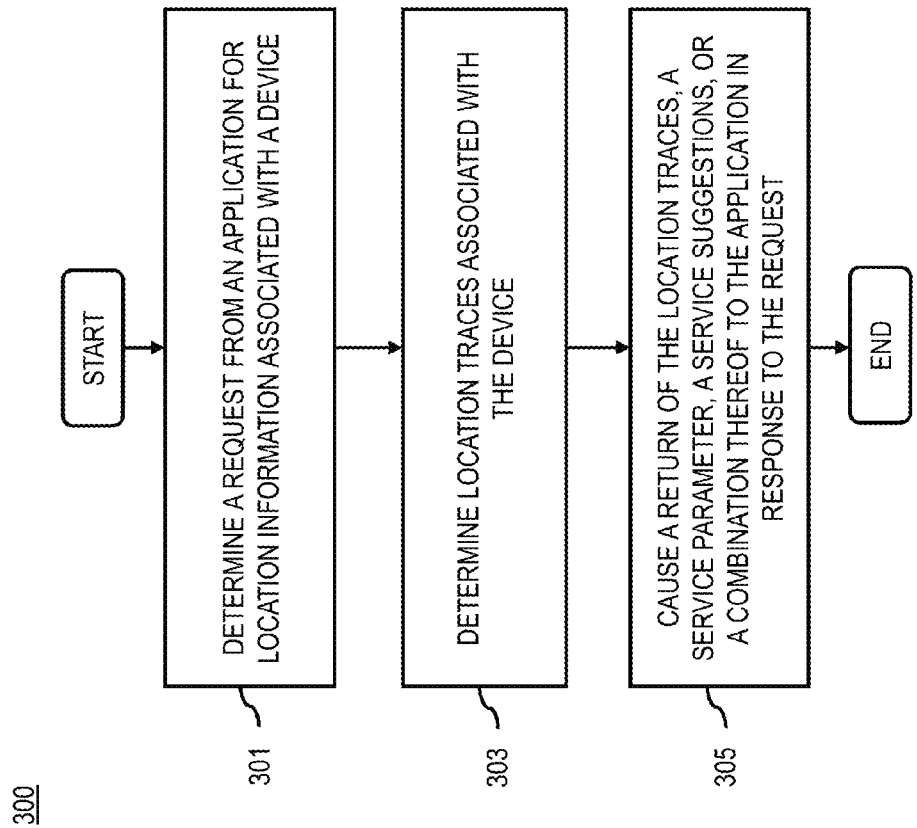
FIGS. 3-5 are flowcharts of processes for providing contemporaneous traces of user movement for algorithms and methods of location-based applications and/or services, according to one embodiment.
Figure 4:
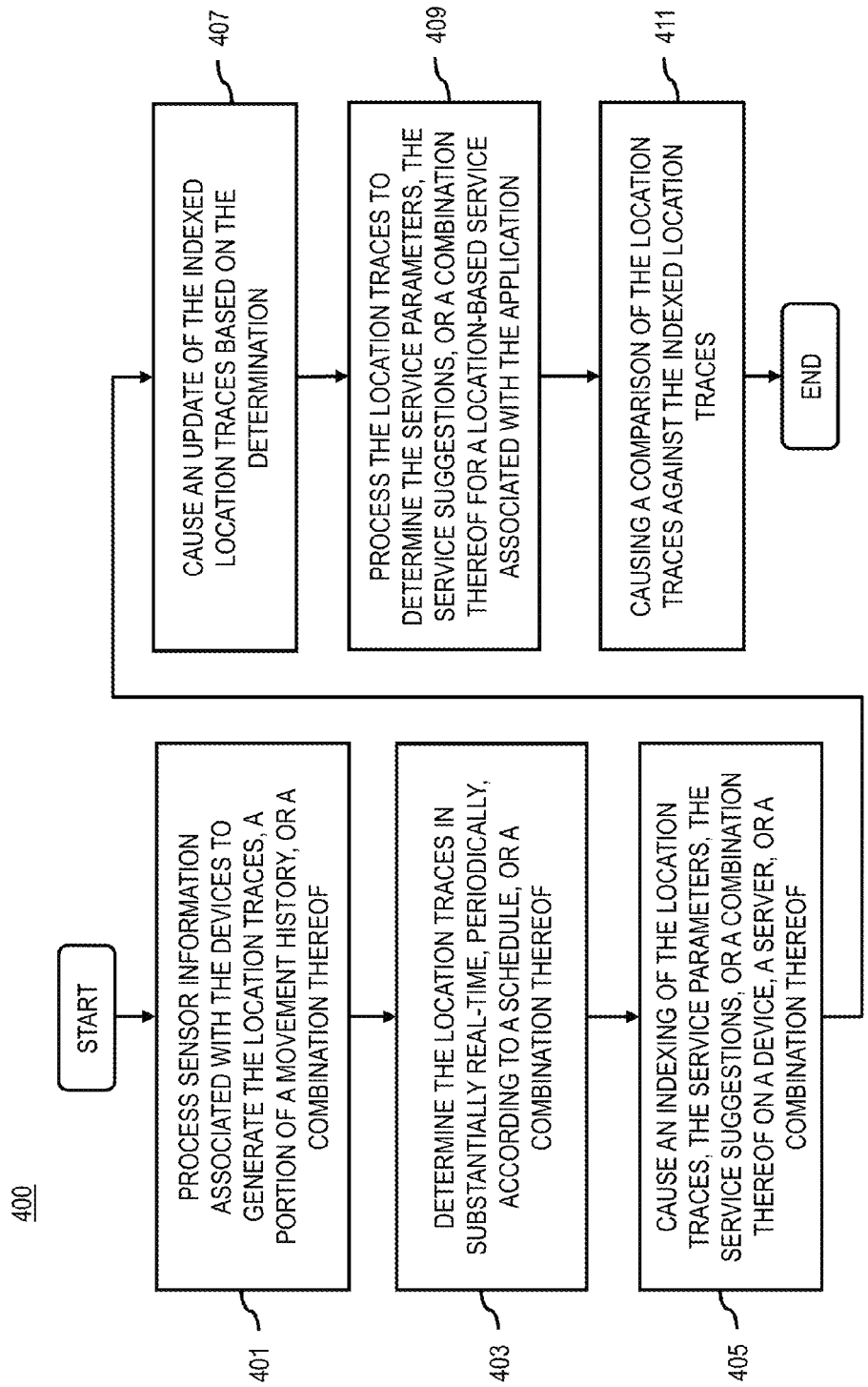
Figure 5:
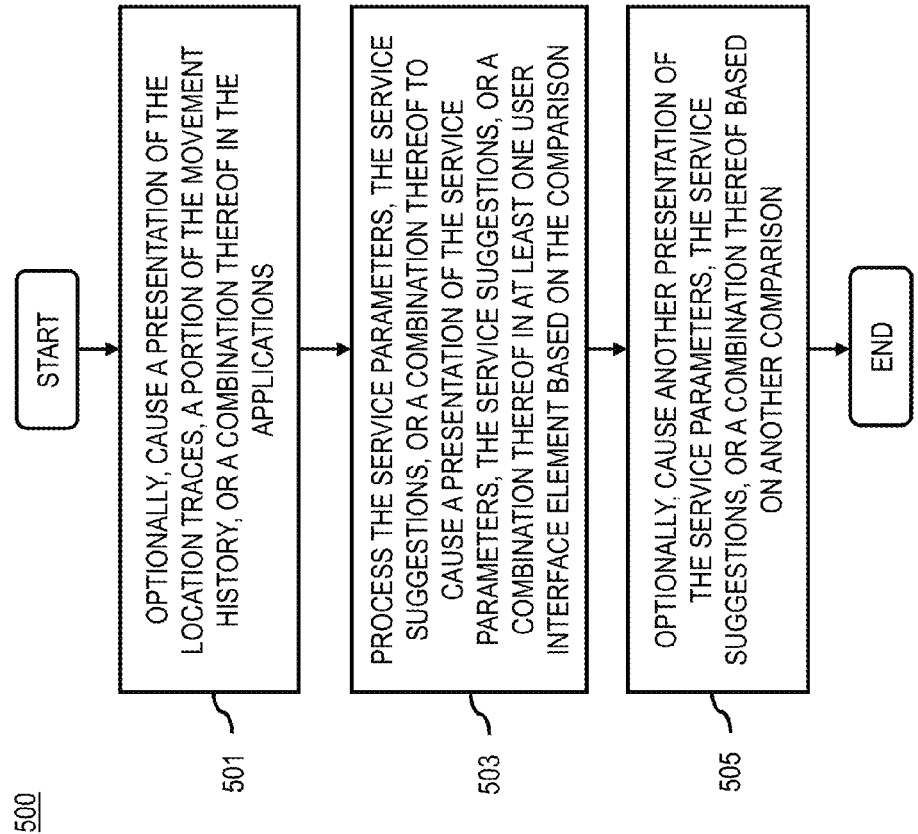
Figure 8:
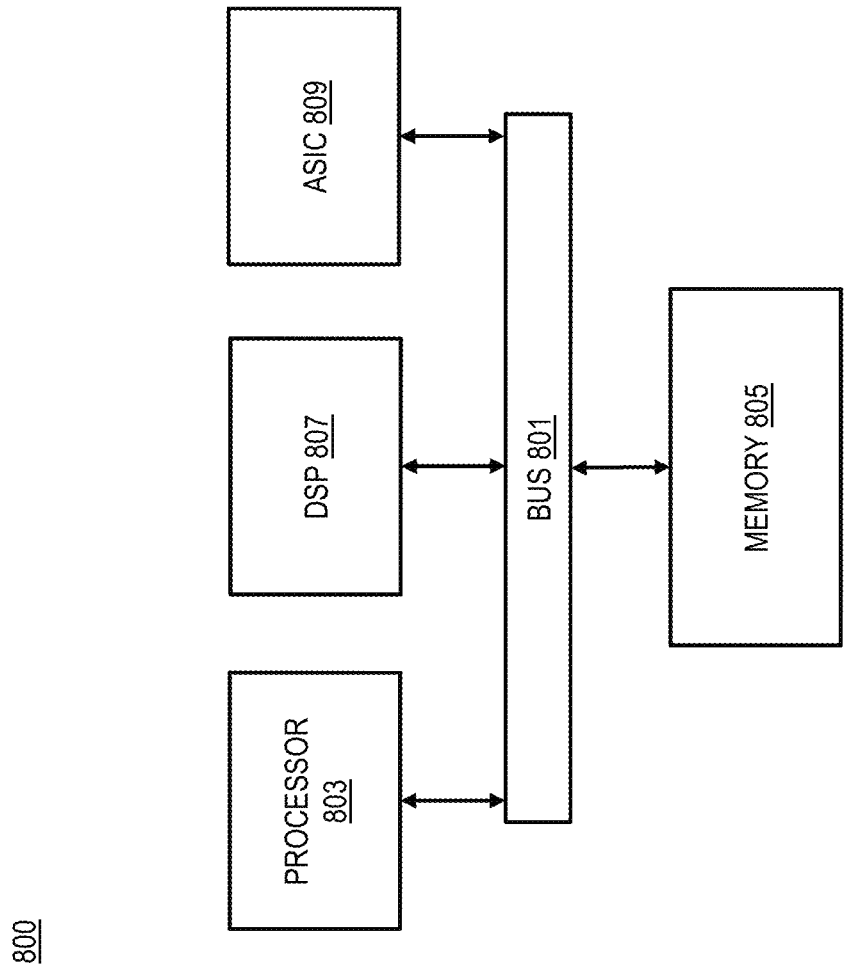
FIG. 8 is a diagram of a chip set that can be used to implement an embodiment of the invention.

FIGS. 3-5 are flowcharts of processes for providing contemporaneous traces of user movement for algorithms and methods of location-based applications and/or services, according to one embodiment. In one embodiment, the location traces platform 103/location traces module 111 performs the process 300 and is implemented in, for instance, a chip set including a processor and a memory as shown in FIG. 8. In step 301, the location traces platform 103 determines a request, from one or more applications, for location information associated with at least one device. By way of example, a user may be vacationing and/or sightseeing in a well-known city such as New York City and want to use his or her mobile device (e.g., a mobile phone or a tablet) to know where he or she is within the city or how to get to a particular landmark or POI. As a result, the user may activate or start a mapping and/or navigation application on his or her mobile device that will then query the location traces platform 103 for a location.

In step 303, the location traces platform 103 determines one or more location traces associated with the at least one device, wherein the one or more location traces represent at least a portion of a movement history associated with the at least one device. By way of example, the one or more location traces may include, at least in part, a tuple sequence of timestamp, position, velocity, and direction determined from one or more sensors associated with the device (e.g., a mobile phone or a tablet), wherein velocity and direction may be optional. For example, the position can be represented as WGS-84 coordinates. By way of further example, the one or more location traces could represent the movement history of a user on a map during a 5-minute walk through a city.

In step 305, the location traces platform 103 causes, at least in part, a return of the one or more location traces, one or more service parameters, one or more service suggestions, or a combination thereof to the one or more applications in response to the request. By way of example, the one or more location traces are returned (e.g., transmitted) to the one or more applications rather than a single coordinate input (e.g., a WGS-84 coordinate). As a result, it is contemplated that the one or more applications and corresponding APIs can instantly determine the movements of the device (e.g., a 5-minute walking history) when implementing one or more location-based services (e.g., a mapping and/or navigation service) as opposed to either (1) relying on a current position or (2) having to run for 5-10 minutes, for example, to record the one or more location traces in response to the request. Moreover, it is also contemplated that returning the one or more location traces to the one or more applications will return a more accurate result, especially in areas where a single coordinate (e.g., a GPS coordinate) will likely have limited accuracy (e.g., in areas where GPS reception is spotty). By way of further example, the one or more service parameters may include a preference to return one or more POIs (e.g., restaurants, banks, landmarks, entertainment facilities, etc.), at least one description of the one or more routes traveled (e.g., public transportation route, construction in progress, etc.), etc. that correspond and/or are relevant to the one or more location traces. Similarly, the one or more service suggestions may include one or more particular places (e.g., a well-known or well-liked restaurant), one or more location-based advertisements, at least one description of the route traveled (e.g., a public transportation route, construction in progress, etc.), etc. that correspond and/or are relevant to the one or more location traces.

FIG. 4 depicts a process 400 of determining one or more location traces associated with the at least one device. In one embodiment, the location traces platform 103/location traces module 111 performs the process 400 and is implemented in, for instance, a chip set including a processor and a memory as shown in FIG. 8. In step 401, the location traces platform 103 processes and/or facilitates a processing of sensor information associated with the one or more devices to generate the one or more location traces, the at least a portion of a movement history, or a combination thereof. By way of example, the one or more devices (e.g., a mobile phone or a tablet) may include, at least in part, a GPS receiver, a low power positioning module, a compass, a magnetometer, an accelerometer, etc. In one example use case, the one or more location traces include a tuple sequence of timestamp, position, velocity, and direction derived from the one or more sensor (e.g., the sensors 109) with velocity and direction being optional. Moreover, the position can be represented as WGS-84 coordinates. In particular, it is contemplated that the one or more location traces should be sufficiently descriptive, but not too big to hamper transmission.

In step 403, the location traces platform 103 determines the one or more location traces in substantially real-time, periodically, according to a schedule, or a combination thereof. By way of example, the low power positioning module may be "always-on" and, therefore, constantly populating and updating the location traces database 113 with one or more location traces. For example, the one or more location traces could represent the movement history of a user on a map during a 5-minute walk through a city.

In step 405, the location traces platform 103 causes, at least in part, an indexing of the one or more location traces, the one or more service parameters, the one or more service suggestions, or a combination thereof on the one or more devices, a server, or a combination thereof, wherein the indexing of the one or more location traces is not dependent on the request of the one or more applications. By way of example, it is contemplated that the location traces platform 103 may index a particular location trace (e.g., trace "1") to a corresponding service suggestions (e.g., POI "1"), trace "n" to POI "n", and so forth. Further, it is contemplated that the location traces database 113 can be indexed in a way that is application "agnostic." By way of further example, the one or more service parameters, the one or more service suggestions, or a combination thereof may relate to or include one or more POIs (e.g., a well-known landmark) and the one or more service parameters, the one or more service suggestions, or a combination thereof may be implemented by the location traces platform 103 using a predictive Bayesian network, for example. In step 407, the location traces platform 103 causes, at least in part, at least one update of the one or more indexed location traces based, at least in part, on the determination. By way of example, as previously discussed, the location traces platform 103 may determine the one or more location traces in substantially real-time, periodically, according to a schedule, or a combination thereof and it is contemplated that the location traces platform 103 can update the index even without an application (e.g., the mapping/navigation application 107) running in the background or foreground.

In step 409, the location traces platform 103 processes and/or facilitates a processing of one or more location traces to determine the one or more service parameters, the one or more service suggestions, or a combination thereof for one or more location-based services associated with the one or more applications. By way of example, the location traces platform 103 determines the corresponding one or more service parameters, one or more service suggestions, or a combination thereof based, at least in part, on the index contained within the location traces database 113. As previously discussed, in one example use case, the one or more service parameters, the one or more service suggestions, or a combination thereof may include an identification of one or more nearby POIs (e.g., restaurants, banks, etc.), one or more location-based advertisements, at least one description of the one or more traveled routes, etc. that correspond and/or are relevant to the one or more location traces. Moreover, the location traces platform 103 may processes and/or facilitate a processing of the one or more location traces in a way that is application "agnostic."

In step 411, the location traces platform 103 causes, at least in part, a comparison of the one or more location traces against one or more indexed location traces, wherein the one or more service parameters, the one or more service suggestions, or a combination thereof are associated with the one or more indexed location traces at least substantially matching the one or more location traces based, at least in part, on the comparison. By way of example, the location traces platform 103 may determine that one or more location traces include a portion of 5$^{th}$ Avenue in New York, for example. The location traces platform 103 can then compare the one or more location traces against one or more indexed location traces also including a portion of 5$^{th}$ Avenue to determine corresponding one or more service parameters, one or more services suggestions, or a combination thereof (e.g., a POI or well-known landmark on 5$^{th}$ Avenue). In addition, in one example use case, it is contemplated that the location traces platform 103 may also cause, at least in part, a comparison of the one or more location traces against one or more indexed location traces associated with one or more other users. For example, a number of users in particular location may walk the same route or path to a POI or well-known landmark (e.g., the Empire State Building, the Eiffel Tower, etc.) and thereby generating a large number of service parameters, service suggestions, or a combination thereof related to the one or more location traces.

FIG. 5 depicts a process 500 of causing, at least in part, a presentation of the one or more service parameters, the one or more service suggestions, or a combination thereof. In one embodiment, the location traces platform 103/location traces module 111 performs the process 500 and is implemented in, for instance, a chip set including a processor and a memory as shown in FIG. 8. In step 501, wherein the one or more applications include, at least in part, a mapping and/or navigation application, the location traces platform 103 causes, at least in part, a presentation of the one or more location traces, the at least a portion of a movement history, or a combination thereof in association with the mapping and/or navigation application. By way of example, a geocoding application that uses location traces could fit or overlay the one or more location traces on a map to return to the user a more accurate result compared to a single coordinate (e.g., a GPS coordinate) input that may likely have limited accuracy—especially in areas where GPS reception is spotty. Moreover, it is contemplated that the presentation of a user's 5-minute walk history on the map by the location traces platform 103 will more quickly orient the user to his or her surroundings compared to the user's location represented as a "dot" on the map.

In step 503, the location traces platform 103 processes and/or facilitates a processing of the one or more service parameters, the one or more services suggestions, or a combination thereof to cause, at least in part, at least one presentation of the one or more service parameters, the one or more services suggestions, or a combination thereof in at least one user interface element based, at least in part, on the comparison. By way of example, the location traces platform 103 can present the one or more POIs associated with the one or more location traces determine by the location traces platform 103 in a display of a mobile device (e.g., a mobile phone or a tablet), for example.

In step 505, wherein the one or more applications are running on the one or more devices, the location traces platform 103 causes, at least in part, at least one other presentation of the one or more service parameters, the one or more services suggestions, or a combination thereof based, at least in part, on at least one other comparison, wherein the at least one other comparison is independent of the request. By way of example, if the mapping/navigation application 107, for example, is running in the background or the foreground of a UE 101 (e.g., a mobile phone or a tablet) and is at least periodically updating the location traces platform 103 about the user's movement history based, at least in part, on one or more location traces, then the location traces platform 103 may automatically compare the one or more location traces against the one or more indexed location traces in the location traces database 113, for example. Then, if the location traces platform 103 determines a match, the location traces platform 103 can cause, at least in part, a notification to be sent back to the mapping/navigation application 107, informing the user that a relevant service suggestion, for example, has been determined by the location traces platform 103.

Figure 6:
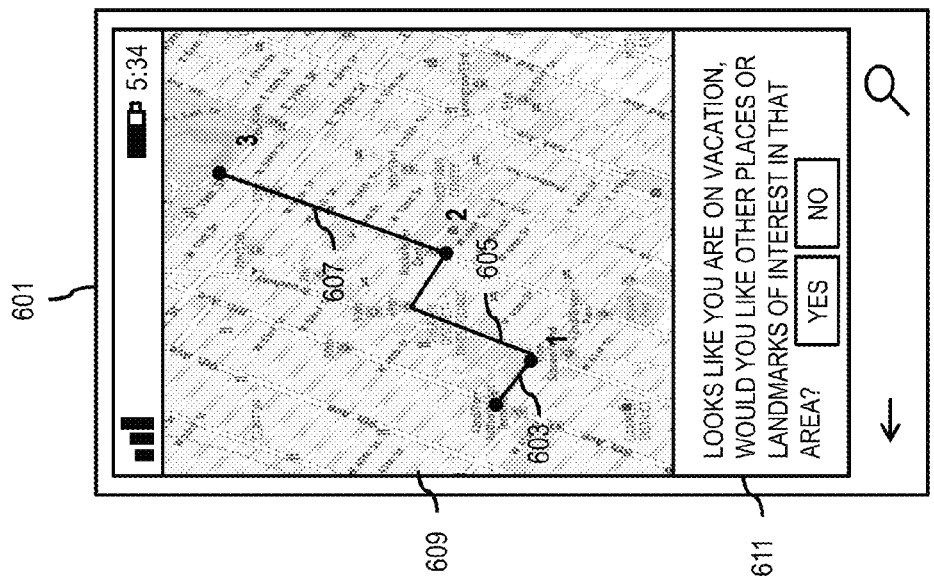
FIG. 6 is a diagram of user interface utilized in the processes of FIGS. 3-5, according to various embodiments.

FIG. 6 is a diagram of a user interface utilized in the processes of FIGS. 3-5, according to various embodiments. As shown, the example user interface of FIG. 6 includes one or more interface elements and/or functionalities created and/or modified based, at least in part, on information, data, and/or signals resulting from the processes (e.g., processes 300, 400, and 500) described with respect to FIGS. 3-5. More specifically, FIG. 6 illustrates a user interface 601 depicting one or more location traces (e.g., traces 603, 605, and 607) overlaid on a mapping and/or navigation application 609. As previously discussed, in one example use case, a user associated with interface 601 may be on vacation and/or sightseeing in a well-known city such as New York City and may want to know where he or she is within the city or how to get to a particular landmark or POI (e.g., Time Square (1), Rockefeller Center (2), Central Park (3), etc.). As a result, the user may start a mapping and/or navigation application 609 on his or her mobile device (e.g., interface 601) that will then query the system 100 for a location or location-based information and will receive in response one or more location traces (e.g., traces 603, 605, and 607), for example.

In one embodiment, the system 100 causes, at least in part, a comparison of the one or more location traces (e.g., traces 603, 605, and 607) against one or more indexed location traces (e.g., stored in a location traces database), wherein the one or more service parameters, the one or more service suggestions, or a combination thereof are associated with the one or more indexed location traces at least substantially matching the one or more location traces based, at least in part, on the comparison. Moreover, as previously discussed, it is contemplated that the system 100 may also cause, at least in part, a comparison of the one or more location traces against one or more indexed location traces associated with one or more other users. In this example use case, the system 100 determines that the location traces 603, 605, and 607 do not substantially match the one or more indexed location traces associated with the user (e.g., the user's trip from his or her home to his or her office or vice-versa), but the location traces 603, 605, and 607 do match those of other users. Once the system 100 determines one or more matches, it is contemplated that the system 100 can cause, at least in part, a notification 611 to be sent back to the mapping and/or navigation application 605 (e.g., offering to recommend one or more other places or landmarks of interest in the proximate area) for presentation on a display of the user interface 601.

The processes described herein for providing contemporaneous traces of user movement for algorithms and methods of location-based applications and/or services may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
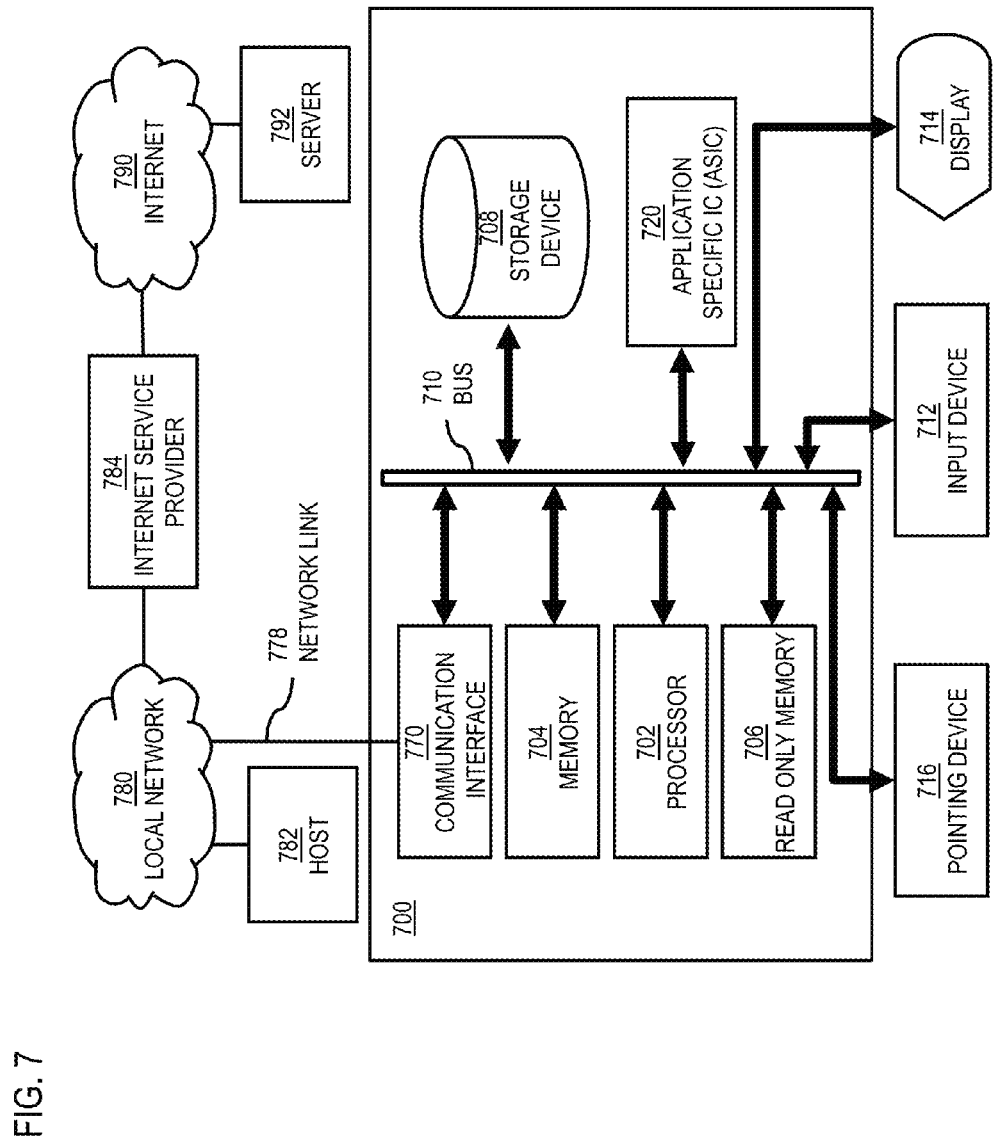
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide contemporaneous traces of user movement for algorithms and methods of location-based applications and/or services as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing contemporaneous traces of user movement for algorithms and methods of location-based applications and/or services.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to provide contemporaneous traces of user movement for algorithms and methods of location-based applications and/or services. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing contemporaneous traces of user movement for algorithms and methods of location-based applications and/or services. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing contemporaneous traces of user movement for algorithms and methods of location-based applications and/or services, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing contemporaneous traces of user movement for algorithms and methods of location-based applications and/or services to the UEs 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide contemporaneous traces of user movement for algorithms and methods of location-based applications and/or services as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing contemporaneous traces of user movement for algorithms and methods of location-based applications and/or services.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide contemporaneous traces of user movement for algorithms and methods of location-based applications and/or services. The memory 805 also stores the data associated with or generated by the execution of the inventive steps.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing contemporaneous traces of user movement for algorithms and methods of location-based applications and/or services. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing contemporaneous traces of user movement for algorithms and methods of location-based applications and/or services. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide contemporaneous traces of user movement for algorithms and methods of location-based applications and/or services. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:

at least one determination, utilizing a processor, of a request, from one or more applications, for location information associated with at least one device;

at least one determination of one or more location traces associated with the at least one device, wherein respective location traces of the one or more location traces represent respective portions greater than a single point of a movement history associated with the at least one device, wherein the respective location traces each include an n-tuple sequence of time stamp information and position information associated with the at least one device, n being an integer greater than 1; and at least one determination of an indexing of the respective location traces of the one or more location traces, wherein the indexing is based, at least in part, on a service parameter;

at least one storage of the indexed one or more location traces in a traces database including the indexed location traces;

at least one transmission of the one or more location traces; and a return of the one or more location traces, one or more service parameters associated with the one or more location traces, one or more service suggestions associated with the one or more location traces, or a combination thereof to the one or more applications in response to the request;
wherein the one or more location traces are always available to the one or more applications even if the one or more location traces were not specifically determined for a particular one of the one or more applications,
wherein respective ones of the one or more location traces include at least one additional parameter associated with the at least one device, the at least one additional parameter being selected from velocity, direction or a combination thereof,
wherein the indexing is further based, at least in part, on a comparison of the one or more location traces with an indexed location trace.

2. A method of claim 1, wherein the (1) data and/or (2) information and/or (3) at least one signal are further based, at least in part, on the following:
a processing of one or more location traces to determine the one or more service parameters, the one or more service suggestions, or a combination thereof for one or more location-based services associated with the one or more applications,
wherein the one or more location traces include velocity information and direction information associated with the at least one device.

3. A method of claim 2, wherein the (1) data and/or (2) information and/or (3) at least one signal are further based, at least in part, on the following:
a comparison of the one or more location traces against one or more indexed location traces,
wherein the one or more service parameters, the one or more service suggestions, or a combination thereof are associated with the one or more indexed location traces at least substantially matching the one or more location traces based, at least in part, on the comparison.

4. A method of claim 3, wherein the (1) data and/or (2) information and/or (3) at least one signal are further based, at least in part, on the following:
a processing of the one or more service parameters, the one or more service suggestions, or a combination thereof to cause, at least in part, at least one presentation of the one or more service parameters, the one or more service suggestions, or a combination thereof in at least one user interface element based, at least in part, on the comparison.

5. A method of claim 1, wherein the (1) data and/or (2) information and/or (3) at least one signal are further based, at least in part, on the following:
at least one determination of the one or more location traces in substantially real-time, periodically, according to a schedule, or a combination thereof; and
at least one update of the one or more indexed location traces based, at least in part, on the determination.

6. A method of claim 2, wherein the (1) data and/or (2) information and/or (3) at least one signal are further based, at least in part, on the following:
an indexing of the one or more location traces, the one or more service parameters, the one or more service suggestions, or a combination thereof on the one or more devices, a server, or a combination thereof,
wherein the indexing of the one or more location traces is not dependent on the request of the one or more applications.

7. A method of claim 4, wherein the one or more applications are running on the one or more devices, and wherein the (1) data and/or (2) information and/or (3) at least one signal are further based, at least in part, on the following:
at least one other presentation of the one or more service parameters, the one or more service suggestions, or a combination thereof based, at least in part, on at least one other comparison,
wherein the at least one other comparison is independent of the request.

8. A method of claim 4, wherein the one or more applications include, at least in part, a mapping and/or navigation application, and wherein the (1) data and/or (2) information and/or (3) at least one signal are further based, at least in part, on the following:
a presentation of the one or more location traces, the at least a portion of a movement history, or a combination thereof in association with the mapping and/or navigation application.

9. A method of claim 1, wherein the (1) data and/or (2) information and/or (3) at least one signal are further based, at least in part, on the following:
a processing of sensor information associated with the one or more devices to generate the one or more location traces, the at least a portion of a movement history, or a combination thereof.

10. An apparatus comprising:
at least one processor; and
at least one memory including computer program code for one or more programs,
the at least one memory and the computer program code configured to, with the at least one processor, cause the apparatus to perform at least the following:
determine a request, from one or more applications, for location information associated with at least one device,
determine one or more location traces associated with the at least one device, wherein respective location traces of the one or more location traces represent respective portions greater than a single point of a movement history associated with the at least one device,
wherein the respective location traces each include an n-tuple sequence of time stamp information and position information associated with the at least one device, n being an integer greater than 1, and
cause, at least in part, at least one determination of an indexing of the respective location traces of the one or more location traces,
wherein the indexing is based, at least in part, on a service parameter,
cause, at least in part, at least one storage of the indexed one or more location traces in a traces database including the indexed location traces;
cause, at least in part, at least one transmission of the one or more location traces, and
cause, at least in part, a return of the one or more location traces, one or more service parameters associated with the one or more location traces, one or more service suggestions associated with the one or more location traces, or a combination thereof to the one or more applications in response to the request,
wherein the one or more location traces are always available to the one or more applications even if the one or more location traces were not specifically determined for a particular one of the one or more applications, wherein respective ones of the one or more location traces include information associated with at least one additional parameter associated with the at least one device, the at least one additional parameter being selected from velocity, direction or a combination thereof, wherein the indexing is further based, at least in part, on a comparison of the one or more location traces with an indexed location trace.

11. An apparatus of claim 10, wherein the apparatus is further caused to:

process and/or facilitate a processing of one or more location traces to determine the one or more service parameters, the one or more service suggestions, or a combination thereof for one or more location-based services associated with the one or more applications, wherein the one or more location traces include velocity information and direction information associated with the at least one device.

12. An apparatus of claim 11, wherein the apparatus is further caused to:

cause, at least in part, a comparison of the one or more location traces against one or more indexed location traces, wherein the one or more service parameters, the one or more service suggestions, or a combination thereof are associated with the one or more indexed location traces at least substantially matching the one or more location traces based, at least in part, on the comparison.

13. An apparatus of claim 12, wherein the apparatus is further caused to:

process and/or facilitate a processing of the one or more service parameters, the one or more service suggestions, or a combination thereof to cause, at least in part, at least one presentation of the one or more service parameters, the one or more service suggestions, or a combination thereof in at least one user interface element based, at least in part, on the comparison.

14. An apparatus of claim 10, wherein the apparatus is further caused to:

determine the one or more location traces in substantially real-time, periodically, according to a schedule, or a combination thereof, and cause, at least in part, at least one update of the one or more indexed location traces based, at least in part, on the determination.

15. An apparatus of claim 11, wherein the apparatus is further caused to:

cause, at least in part, an indexing of the one or more location traces, the one or more service parameters, the one or more service suggestions, or a combination thereof on the one or more devices, a server, or a combination thereof, wherein the indexing of the one or more location traces is not dependent on the request of the one or more applications.

16. An apparatus of claim 13, wherein the one or more applications are running on the one or more devices, and wherein the apparatus is further caused to:

cause, at least in part, at least one other presentation of the one or more service parameters, the one or more service suggestions, or a combination thereof based, at least in part, on at least one other comparison, wherein the at least one other comparison is independent of the request.

17. An apparatus of claim 13, wherein the one or more applications include, at least in part, a mapping and/or navigation application, and wherein the apparatus is further caused to:

cause, at least in part, a presentation of the one or more location traces, the at least a portion of a movement history, or a combination thereof in association with the mapping and/or navigation application.

18. An apparatus of claim 10, wherein the apparatus is further caused to:

process and/or facilitate a processing of sensor information associated with the one or more devices to generate the one or more location traces, the at least a portion of a movement history, or a combination thereof.

* * * * *